Feb. 18, 1969
R. O. EAVES
3,428,196
CONVEYOR SYSTEM
Filed March 13, 1967
Sheet 3 of 5
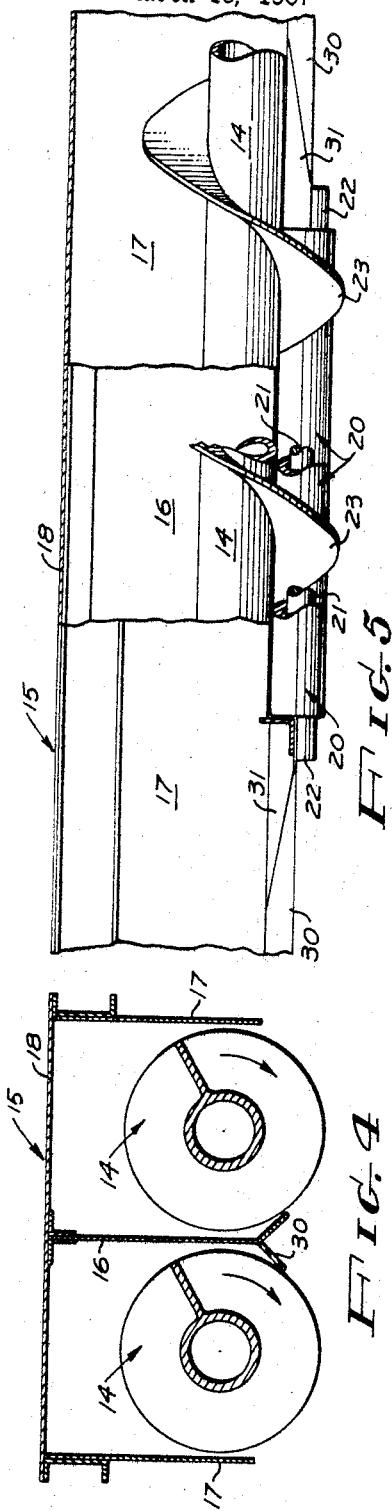
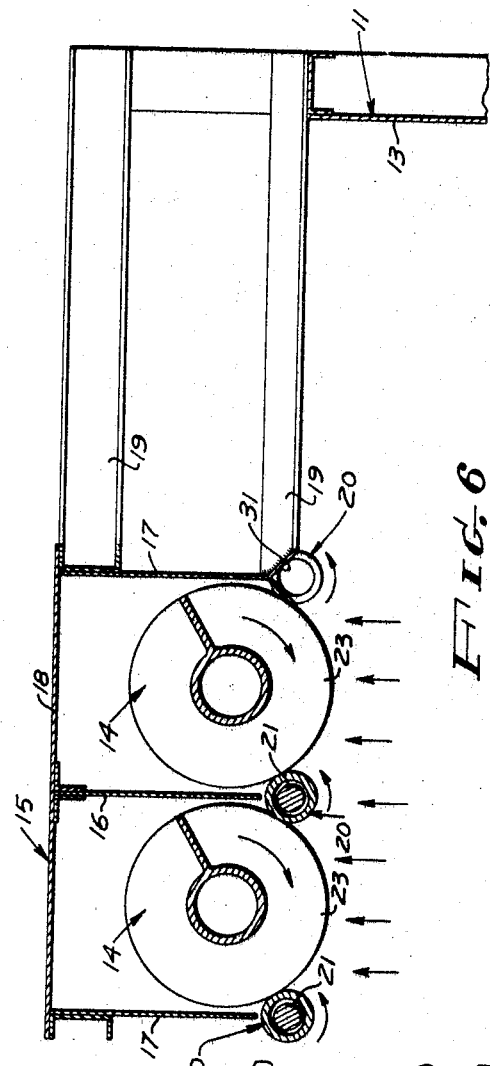
RAYMOND O. EAVES
INVENTOR.
BY
*Lyon & Lyon*
ATTORNEYS

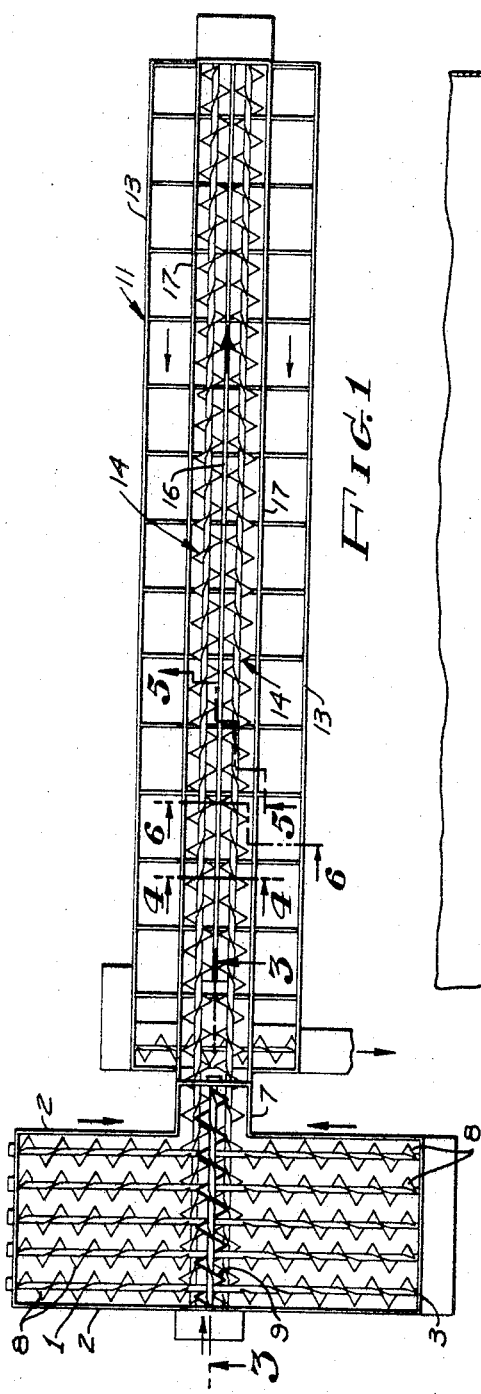

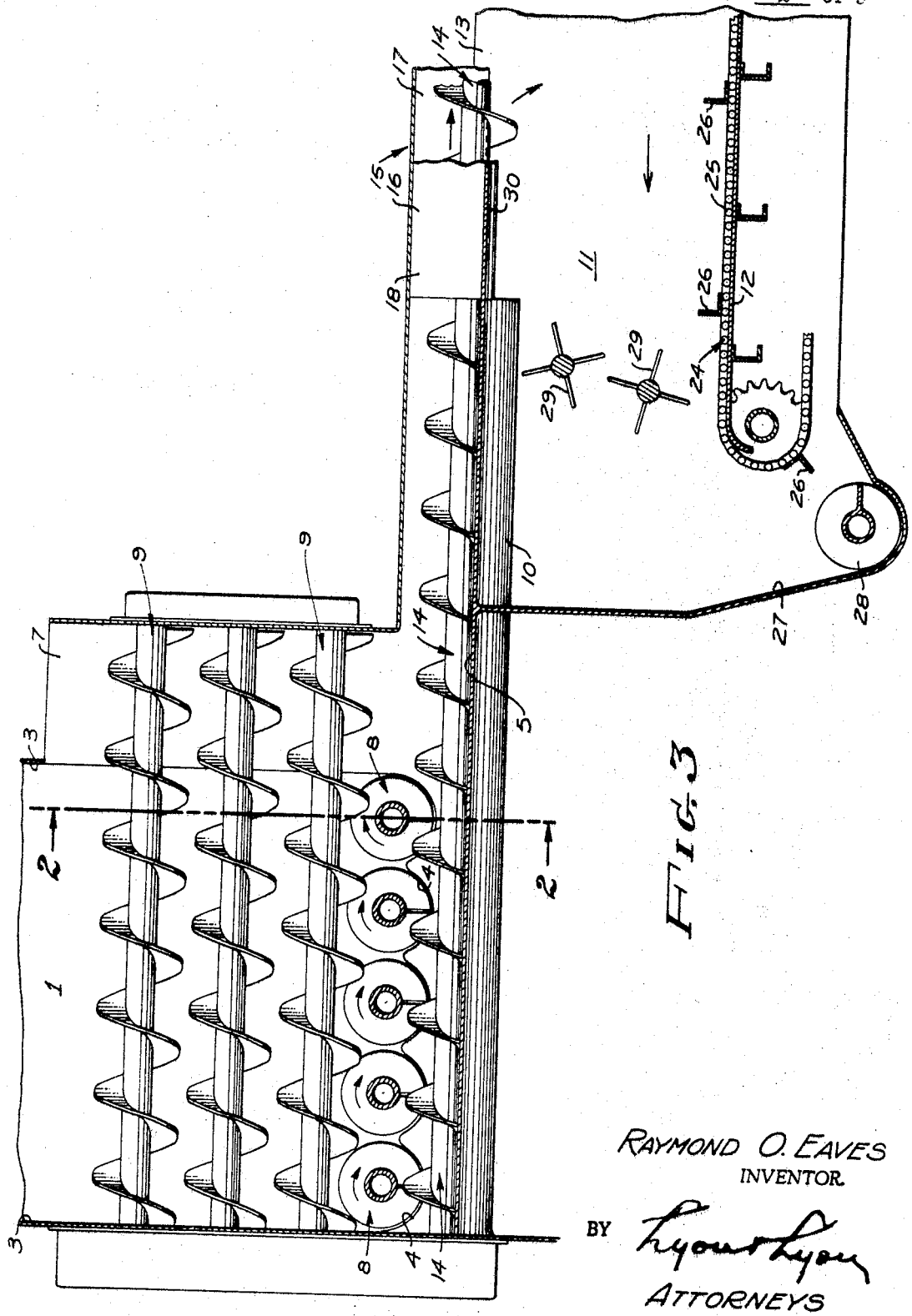

United States Patent Office 3,428,196
Patented Feb. 18, 1969

3,428,196
CONVEYOR SYSTEM
Raymond O. Eaves, Brawley, Calif., assignor to Batley-Janss Enterprises, Brawley, Calif., a corporation of California
Filed Mar. 13, 1967, Ser. No. 622,556
U.S. Cl. 214—17                                    5 Claims
Int. Cl. B65g 65/32, 65/46; A01f 25/00

ABSTRACT OF THE DISCLOSURE

A conveyor system wherein bulk material is transferred from a receiving bin to a feeding bin by a screw conveyor extending transversely under the receiving bin and longitudinally over the feeding bin. The receiving bin having bottom screw conveyors which direct the material to a point of discharge over the transfer conveyor, and dividing screw conveyors extending transversely over the bottom conveyors and longitudinally over the transfer conveyors to prevent packing of the material. The transfer conveyor discharges along its length into the feeding bin in such a manner that the material itself tends to support the transfer conveyor; the transfer conveyor being otherwise resting on sets of rollers. The feeding bin has a slow moving bottom conveyor which moves in the opposite direction to the transfer conveyor so that the first material received by the feeding bin is the first material out.

Background of invention

This invention is particularly concerned with the continuous handling of alfalfa; that is, the cut alfalfa is received periodically by truckload and discharged continuously, but at a variable rate to a dehydrator. Alfalfa contains fibrous strands and tends to pack. It may be wet or relatively dry so that it is difficult to convey. Also, in order that the discharge be continuous, an elongated storage and feed bin with corresponding long screw type delivery conveyors are required which poses a problem of proper support without interference with the movement of the alfalfa.

Accordingly, the objects of this invention include:

First, to provide a conveyor system which includes a receiving bin having a novel arrangement of screw conveyors whereby the contents of the bin is fed from opposite ends toward the center of the bin, and simultaneously at the center transversely disposed upper and lower sets of screw conveyors disposed above and below the longitudinal conveyors carry the contents laterally from the bin whereupon the contents fall freely onto the lower conveyors for removal.

Second, to provide a conveyor system which includes a novelly arranged elongated screw conveyor disposed over a feed bin having a bottom drag conveyor, wherein the material carried by the screw conveyor falls freely into the feed bin until it piles to the height of the screw conveyor and serves to support the screw conveyor.

Third, to provide an elongated screw conveyor incorporating a novel supporting means in the form of elongated rollers on which the helical blades of the conveyor rest; the screw conveyor being capable of limited upward deflection when supported on the material being conveyed so as to clear the rollers and minimize wear.

Fourth, to provide a conveyor system which is particularly adapted to convey fibrous material, such as alfalfa, while maintaining the material in a free transportable state.

Description of drawings

FIGURE 1 is a diagrammatical plan view of the conveyor system.
FIGURE 2 is an enlarged fragmentary sectional view taken through 2—2 of FIGURE 3.
FIGURES 3, 4, 5 and 6 are enlarged fragmentary sectional views taken through 3—3, 4—4, 5—5 and 6—6, respectively, of FIGURE 1.

Specification

The conveyor system includes a receiving bin 1 which is rectangular in plan and open at its upper side. The bin is thus bounded by side walls 2 and end walls 3. The bottom of the bin is provided with a series of longitudinally extending bottom channels 4 of semi-cylindrical cross section. The longitudinal channels terminate near the center of the bin, to form two sets in confronting spaced relation, separated by a pair of transverse bottom channels 5 located at a lower level. One side wall above the region occupied by the transverse bottom channels 5 is provided with a side opening 6, and this side of the receiving bin is provided with a side extension 7, into which the bottom channels 5 extend.

The longitudinal bottom channels 4 receive longitudinal screw conveyors 8. In the construction illustrated five such conveyors are provided and completely fill the bottom of the bin. Each screw conveyor 8 has a right hand screw portion and a left hand screw portion, the two portions being separated the width of the transverse bottom channels 5. The screw conveyors 8 are driven at the same speed by conventional drive means located at one end. By reason of the right and left pitch portions of each screw conveyor 8, material contained in the receiving bin is fed from the extremities toward the center of the bin, and thus the screw conveyors 8 may be termed center feeding conveyors.

Located above the center feeding conveyors 8, over the bottom channels 5, is a set of transverse screw conveyors 9. Three conveyors are shown, arranged one above the other, to form a wall dividing the receiving bin. The conveyors 9 extend into the side extension 7. The screw conveyors 9 direct the material in the receiving bin transversely into the side extension 7, and thus the screw conveyors 9 may be termed divider screw conveyors.

The transverse bottom channels 5 protrude beyond the side extension 7, forming bottom channel extensions 10, which overlie one end of an elongated feed bin 11. The feed bin includes a bottom wall 12 and side walls 13. A pair of transferring screw conveyors 14 are received in the bottom channels 5 and their extensions 10 and continue therefrom the entire length of the feed bin 11. That portion of the transferring screw conveyors 14 overlying the feed bin 11 is contained in a conveyor housing 15, comprising a center partition 16, side walls 17, and a top wall 18. The center partition 16 is disposed between the two screw conveyors and the side walls are disposed laterally thereof. The underside of the housing is open. The housing is suitably supported by brace members 19 extending to the side walls 13 of the feed bin.

In order to support the screw conveyors 14, the center partition 16 and side walls 17 are provided at their lower margins with elongated rollers 20, mounted on shafts 21, secured in end bearings 22. Each roller is engaged by the peripheral edge of a conveyor vane 23. The rollers 20 operate in pairs to support the two conveyors 14.

A drag conveyor 24 overlies the bottom wall 12 of the feed bin. The drag conveyor may comprise a pair of chains 25, joined by cross cleats 26.

At the end of the feed bin 11, adjacent the receiving bin 1, the feed bin is provided with a sump 27, into which the drag conveyor 24 discharges. Mounted in the bottom of the sump 27 is a laterally and horizontally extending discharge screw conveyor 28. The sump is located under the bottom channel extension 10 and between the extension 10 and the discharge end of the drag conveyor 24, are a pair of rotary kickers 29 which control the movement of material.

The bottom edge of the center partition 16 is provided with depending diverging webs 30. A similar skirt may extend along the bottom edges of the side walls 17; however, it is sufficient merely to place deflectors 31 at the leading and trailing ends of the rollers 20.

Operation of the conveyor system is as follows:

The material to be handled is deposited periodically in the receiving bin 1. By way of example, the material may be freshly cut alfalfa, which is delivered to the receiving bin by truckload. In this case, the receiving bin is dimensioned to receive one or two truckloads, so that the alfalfa stacks several feet above the center feeding conveyors 8; however, the upper divider screw conveyor is near the top of the deposited alfalfa.

The center feeding conveyors 8 operate directly on the material at the bottom of the receiving bin, and deliver the bottom layer of material directly to the transferring screw conveyors 14. The remaining material, resting on the bottom layer is also moved toward the center of the receiving bin. This upper material would, except for the divider screw conveyors 9, tend to pack. This is particularly true of alfalfa or other fibrous material, or material having a water content. The divider conveyors 9 prevent such packing and instead move the material transversely into the side extensions 7, and permit the material to fall onto the transferring screw conveyors 14.

As the alfalfa or other material is carried beyond the channel extension 10, the material falls freely from the screw conveyors 14 onto the bottom wall of the feed bin 11. The material piles upon itself until it reaches the height of the transferring screw conveyors before the material is carried further along the screw conveyors. The capacity of the feed bin 11 is several times that of the receiving bin 1, so that the feed bin serves to store the material between delivery of the material to the receiving bin.

The drag conveyor 24 moves slowly so that it may operate continuously. The front of the material deposited in the feed bin therefore moves forwardly as material is supplied from the receiving bin or recedes during waiting periods between supplies from the receiving bin.

It should be noted that the rollers 20 eliminate the need of any bearings directly supporting the shafts of the screw conveyors 14, thus eliminating the suspension brackets for such bearings. As a consequence, the screw conveyors are open throughout their lengths. This is particularly important in the handling of fibrous materials such as alfalfa, which would tend to pack around such bearings and their brackets.

The rollers 20 function primarily in the region between the front of the material in the bin and the far end of the bin, for the material in filling the space under the screw conveyors actually provides a support therefor. In fact, as the material fills in under the conveyors, the conveyors are lifted slightly and clear the rollers, thus minimizing wear thereon.

I claim:

1. A conveyor system, comprising:
   (a) a receiving bin having an open upper side to receive periodically a quantity of material;
   (b) an elongated feeding bin extending laterally from the central portion of said receiving bin;
   (c) a dividing conveyor extending transversely and protruding laterally beyond said receiving bin at the central portion thereof;
   (d) an elongated transferring conveyor extending transversely across the bottom of said receiving bin under and in alignment with said dividing conveyor and continuing from said receiving bin longitudinally over said feeding bin;
   (e) means enclosing the protruding end of said dividing conveyor for directing the discharge therefrom onto said transferring conveyor;
   (f) and longitudinal conveyors extending between the ends of the receiving bin and the center thereof and operable to move the contents of said receiving bin toward said transferring conveyor and said dividing conveyor.

2. A conveyor system, as defined in claim 1, wherein:
   (a) the transferring conveyor is a screw conveyor and the portion of said transferring conveyor overlying said feeding bin is open at its under side whereby material falls freely therefrom and piles in said feeding bin until said material partially supports said transferring conveyor;
   (b) spaced sets of elongated rollers underlie said screw conveyor for supporting the weight thereof prior to piling of material under said conveyor;
   (c) a feeding conveyor moves the piled material along said feeding bin in a direction opposite from said transferring conveyor;
   (d) and means is provided to discharge the material from said feeding conveyor.

3. A conveyor system, as defined in claim 1, wherein:
   (a) said conveyors are screw conveyors;
   (b) said divider conveyor comprises a set of screw conveyors occupying a common plane and extending substantially to the top of the contents of said receiving bin thereby to form a deflecting barrier between the approaching portions of said contents.

4. A conveying means, comprising:
   (a) an elongated bin;
   (b) a lower conveyor movable along the bottom of said bin for discharging the contents thereof;
   (c) an elongated upper conveyor disposed over said bin, said upper conveyor including a helical blade;
   (d) a housing for said upper conveyor including a top wall and depending side walls, said side walls defining therebetween a continuous downwardly open channel for gravity discharge of material from said upper conveyor;
   (e) and sets of laterally spaced rollers suspended from said side walls with their axes parallel to the axis of said upper conveyor, said helical blade resting on and rotatable on said rollers, said upper conveyor being upwardly deflectable to clear said rollers;
   (f) and means for driving said conveyors at related speeds whereby said upper conveyor delivers material at a faster rate than said lower conveyor discharges material, thereby causing material delivered by said upper conveyor to pile up thereunder and partially support said upper conveyor.

5. A conveyor system, comprising:
   (a) receiving bin adapted to receive intermittently a quantity of material;
   (b) an elongated feeding bin extending from said receiving bin;
   (c) an elongated transferring screw conveyor having a receiving section disposed transversely under the central portion of said receiving bin to receive material from said receiving bin and extending therefrom over said feeding bin, the under side of that portion of said conveyor overlying said feeding bin forming an open channel for gravity discharge of said material progressively into said feeding bin;
   (d) sets of rollers for supporting said transferring screw conveyor, said rollers being substantially smaller in diameter than said screw conveyor and engageable at spaced points with the periphery of said conveyor and forming therebetween a continuation of said open channel for gravity discharge of material from said conveyor whereby said screw conveyor forms an uninterrupted path throughout its length for the propulsion of material, and an uninterrupted discharge channel;

(e) a set of feeding conveyors extending from the ends of said feeding bin toward the center thereof to deposit material on said transferring screw conveyor;

(f) and a set of dividing conveyors disposed at the center of said receiving bin above said transferring screw conveyor to direct said material transversely, said dividing conveyors and the central portion of said receiving bin having a lateral extension overlying said transferring screw conveyor for discharge of material thereon.

References Cited

UNITED STATES PATENTS

| | | | |
|---|---|---|---|
| 1,835,989 | 12/1931 | Hofft et al. | 214—17 |
| 2,728,470 | 12/1955 | Peterson | 214—17 |
| 2,851,173 | 9/1958 | Morrison | 214—17 |
| 2,981,402 | 4/1961 | Cleaveland | 214—17 |

ROBERT G. SHERIDAN, *Primary Examiner.*

U.S. Cl. X.R.

222—271